United States Patent [19]
Plestan

[11] Patent Number: 5,911,378
[45] Date of Patent: Jun. 15, 1999

[54] QUICK CHANGE SPINNING REEL SPOOL

[75] Inventor: M. Alain Plestan, Marignier, France

[73] Assignee: Johnson Worldwide Associates, Inc., Sturtevant, Wis.

[21] Appl. No.: 08/881,455

[22] Filed: Jun. 24, 1997

[51] Int. Cl.⁶ .................................................. A01K 89/01
[52] U.S. Cl. .................... 242/322; 242/231; 242/323; 242/609.3
[58] Field of Search ................................ 242/314, 317, 242/318, 322, 608.5, 609.3

[56] References Cited

U.S. PATENT DOCUMENTS

| | | | |
|---|---|---|---|
| 2,312,899 | 3/1943 | Hamburger | 242/608.5 |
| 2,755,037 | 7/1956 | Sarah . | |
| 2,942,799 | 6/1960 | Meulnart . | |
| 3,565,362 | 2/1971 | Lilland et al. . | |
| 3,682,411 | 8/1972 | Dumbauld . | |
| 3,693,901 | 9/1972 | Lilland et al. . | |
| 3,870,245 | 3/1975 | Witteborg, Jr. . | |
| 3,979,082 | 9/1976 | Morishita . | |
| 4,106,718 | 8/1978 | Catignani . | |
| 4,216,921 | 8/1980 | Puryear . | |
| 4,327,880 | 5/1982 | Borbandt | 242/318 |
| 4,651,945 | 3/1987 | Ruin . | |
| 5,078,334 | 1/1992 | Zanon . | |
| 5,120,003 | 6/1992 | Sacconi | 242/322 |
| 5,333,813 | 8/1994 | Hirano | 242/322 |
| 5,372,322 | 12/1994 | Fortson | 242/317 |
| 5,456,418 | 10/1995 | Hitomi . | |
| 5,513,813 | 5/1996 | Bernard et al. . | |
| 5,573,193 | 11/1996 | Bernard et al. | 242/319 |
| 5,603,465 | 2/1997 | Henrikson | 242/322 |
| 5,607,114 | 3/1997 | Henrikson | 242/318 |
| 5,755,391 | 5/1998 | Sacconi | 242/317 |

FOREIGN PATENT DOCUMENTS

| | | | |
|---|---|---|---|
| 125763 | 10/1947 | Australia | 242/318 |
| 3604700 | 8/1987 | Germany . | |

*Primary Examiner*—Katherine Matecki
*Attorney, Agent, or Firm*—Foley & Lardner

[57] ABSTRACT

A fishing reel including a reel body having a spool support shaft with an outer circumferential surface and a spool having a hollow spool hub with an inner circumferential surface for extending about the shaft adjacent the outer circumferential surface. A recess is formed along the circumferential surface of a first one of the support shaft and the spool hub. An axial passage is further formed in the circumferential surface of the first one of the support shaft and the spool hub. The axial passage communicates with the recess. A lug radially projects from the circumferential surface of a second one of the support shaft and the spool hub. In one preferred embodiment, the recess is helical. In one preferred embodiment, the spool additionally includes a line clip for releasably capturing fishing line adjacent the spool.

27 Claims, 3 Drawing Sheets

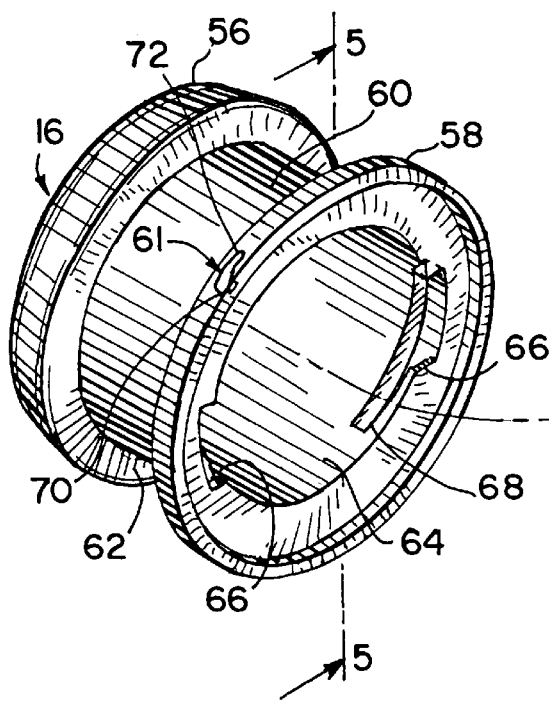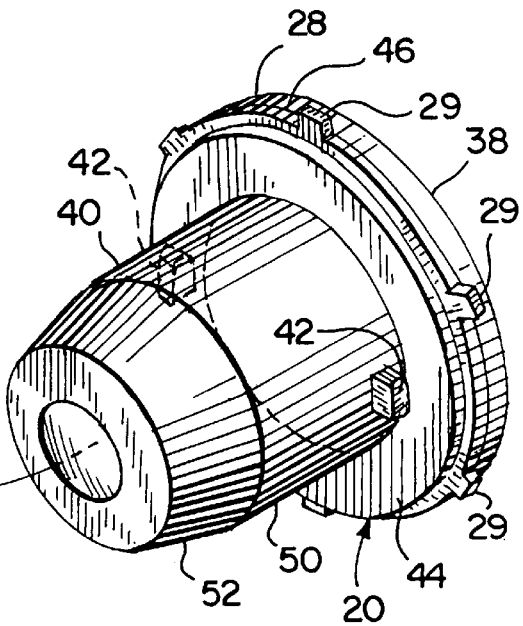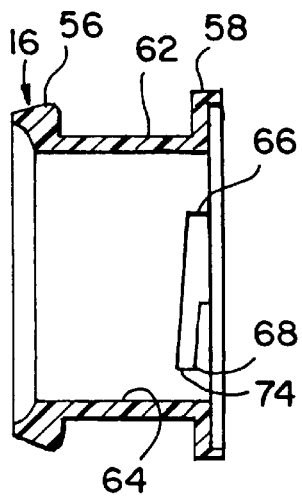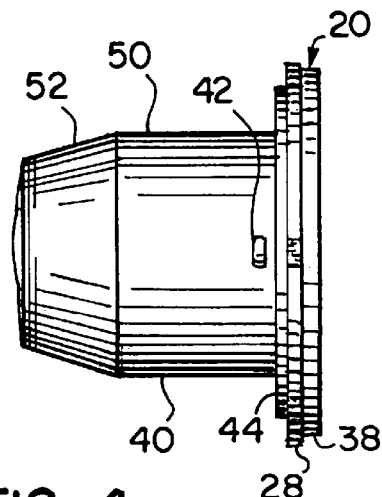
FIG. 3
FIG. 5
FIG. 4

QUICK CHANGE SPINNING REEL SPOOL

FIELD OF THE INVENTION

The present invention relates to fishing reels. In particular, the present invention relates to a compact and easily manufactured removable spool that is quickly and easily coupled to the fishing reel.

BACKGROUND OF THE INVENTION

Standard fishing reels for casting include a reel body with means for fixing the reel body to a fishing rod, a spool and line recovery means. Reel bodies have a variety of sizes and shapes and are configured for carrying the spool which supplies fishing line. The line recovery means typically includes a transmission mechanism inside the reel body and a crank for rotating a flyer about the spool. The flyer carries a retractable line recovery device bail which recovers and guides the fishing line as it is wound about the spool during rotation of the flyer. During casting, the bail is pivoted out of engagement with the fishing line to dispense the fishing line.

Over time, the supply of fishing line carried by the spool becomes depleted and must be replaced. Moreover, it is often desirable to replace the current fishing line being used with a heavier or lighter weight fishing line depending upon the weight of the bait or lures, the fishing environment and the size and type of fish being sought. As a result, fishing reels are typically provided with removable spools of fishing line so that spools may be easily exchanged or replaced.

Removable spools are removably mounted to the reel body by a variety of means. For example, many removable spools are axially positioned about a support shaft of the reel body. To prevent rotation of the spool, the spool and the support shaft are keyed relative to one another. To axially maintain the spool on the support shaft, a nut is threadably secured on an end of the support shaft to capture the spool against the reel body. Unfortunately, the nut used to secure the spool often loosens, becomes separated from the support shaft and is lost. The nut also is frequently lost during the replacement or exchange of spools.

To eliminate the nut, many fishing reels include threaded spools which are threaded upon and about the support shaft of the reel. In particular, the threaded spools include internal threads which threadably engage external threads on the support shaft. As with the nuts, the threaded spools require precise alignment of the threads and multiple turns to axially secure the spool to the fishing reel body.

In an attempt to reduce the time required to change spools, Meulnart, U.S. Pat. No. 2,942,799, issued Jun. 28, 1960, discloses a spool having outwardly extending radial flaps. The radial flaps register within gaps between peripheral locking flanges spaced from the reel body. Rotation of the spool captures the radial flaps between the locking flanges and the reel body to axially secure the spool to the reel body.

Although allowing quicker spool exchange, the Meulnart spool is bulky, expensive to manufacture and inconvenient to store. Because the radial flaps extend outwardly from the Meulnart spool and because the locking flanges of the reel body extend around and about the radial flaps, the overall diameter of the reel body as well as its weight are undesirably increased. Because the locking flanges of the Meulnart spool extend around and about the radial flaps, the reel body is complex and difficult to manufacture. Moreover, unless the spacing between the locking flanges and the reel body is precisely controlled to closely match the thickness of the radial flaps, the spool will axially reciprocate along the support shaft. Alternatively, precisely controlling the spacing between the locking flanges and the reel body is difficult and increases manufacturing costs.

Furthermore, because the radial flaps extend outwardly from the spool body, the overall size of the spool is increased. As a result, the spool is more space consuming within an angler's tackle box. In addition, because the radial flaps extend outwardly from the spool, the radial flaps often catch and become tangled with other lures, hooks and fishing accessories stored within a tackle box.

SUMMARY OF THE INVENTION

The present invention is directed to a fishing reel including a reel body having a spool support shaft with an outer circumferential surface and a spool having a hollow spool hub with an inner circumferential surface for extending about the shaft adjacent the outer circumferential surface. A recess is formed along the circumferential surface of a first one of the support shaft and the spool hub. An axial passage is further formed in the circumferential surface of the first one of the support shaft and the spool hub. The axial passage communicates with the recess. A lug radially projects from the circumferential surface of a second one of the support shaft and the spool hub. In one preferred embodiment, the recess is helical.

The present invention is also directed to a fishing reel including a reel body having a spool support shaft and a spool having a hollow spool hub for being carried by the support shaft. The spool support shaft of the reel body includes lugs radially projecting from the shaft. The hollow spool hub includes a circumferential lug receiving groove formed along an inner diameter of the spool and an axial passage communicating with the circumferential groove.

The present invention is also directed to a fishing reel including a reel body and a spool. A helical recess is formed within a first one of the reel body and the spool. An axial recess is also formed within the first one of the reel body and the spool. A lug projects from the second one of the reel body and the spool such that the lug is axially inserted through the axial passage into the helical recess. Relative rotation of the spool and the reel body couples the spool to the reel body.

The present invention is also directed to a spool for use with a fishing reel including a reel body having a spool support shaft with a radially projecting lug. The spool includes a hollow hub having an outer circumferential surface, an inner circumferential surface, a lug receiving recess formed within the inner circumferential surface and an axial passage formed within the inner circumferential surface and communicating with the recess.

BRIEF DESCRIPTION OF THE DRAWINGS

FIG. 3 is a perspective view of the spool separated from the outer support shaft.

FIG. 4 is a side elevational view of the outer support shaft of FIG. 3 including lugs.

FIG. 5 is a sectional view of the spool of FIG. 3 including an axial passage and a helical recess.

DETAILED DESCRIPTION OF THE PREFERRED EMBODIMENTS

Figure 1:
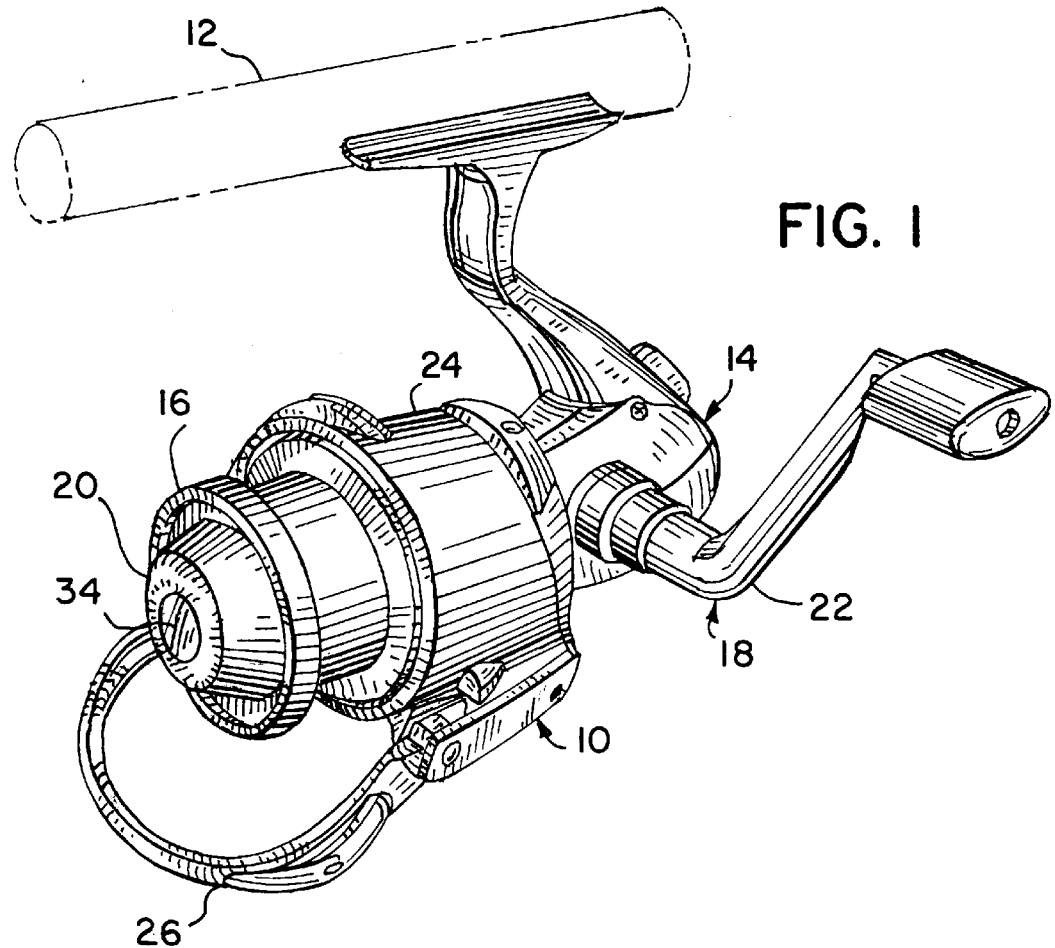
FIG. 1 is a perspective view of a fishing reel of the present invention.

FIG. 1 is a perspective view illustrating fishing reel 10 configured for being mounted to a fishing rod 12 (shown in phantom). Fishing reel 10 generally includes reel body 14, bobbin or spool 16 and line recovery device 18. Reel body 14 mounts reel 10 to rod 12 and supports spool 16 and line recovery device 18. Reel body 14 includes an outer support shaft 20 configured for supporting spool 16.

Spool 16 is configured for being removably positioned about outer support shaft 20 adjacent reel body 14. Spool 16 contains fishing line (not shown) for being cast and for being retrieved by line recovery device 18. Because spool 16 is removably mounted to outer support shaft 20, spool 16 may be easily removed and replaced with an alternative spool containing a different length or weight of fishing line.

Line recovery device 18 returns cast fishing line to spool 16 and generally includes crank 22, a conventionally known transmission device (not shown), flyer 24 and bail 26. Crank 22 is operably coupled to reel outer support shaft 20 and flyer 24 through the mechanical transmission device housed within reel body 14. Rotation of crank 22 reciprocates outer support shaft 20 and spool 16 in a conventionally known manner. At the same time, rotation of crank 22 also rotates flyer 24 and bail 26 in a conventionally known manner about outer support shaft 20 and spool 16. Bail 26 is pivotally coupled to flyer 24 for being pivoted into and out of engagement with the fishing line for recovering and dispensing fishing line, respectively. Although line recovery device 18 has been illustrated as including flyer 24 and bail 26 which are rotated about a reciprocating outer support shaft 20 and spool 16, various other conventionally known line recovery devices may be used in lieu of line recovery device 18.

Figure 2:
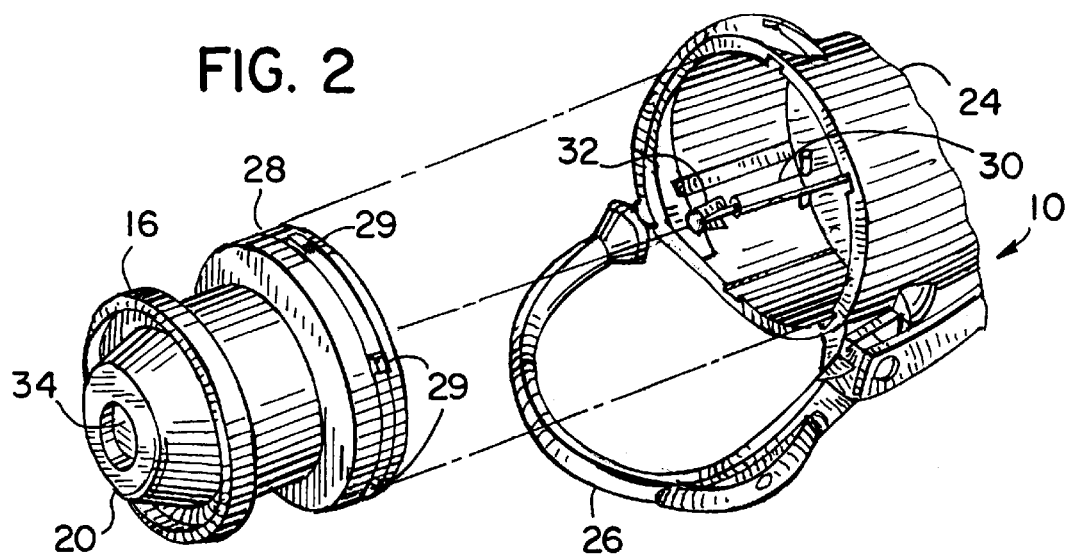
FIG. 2 is a fragmentary perspective of an outer support shaft and spool removed from a reel body and line recovery device of the reel.

FIG. 2 is a fragmentary perspective view of reel 10 illustrating outer support shaft 20 and spool 16 being removed from reel body 14 and line recovery device 18. As shown by FIG. 2, reel 10 preferably includes ring 28 captured between outer support shaft 20 and spool 16. Ring 28 includes projections 29 which prevent entry of fishing line between outer reel 20 and flyer 24. Ring 28 is described in greater detail in U.S. Pat. No. 5,573,193 issued on Nov. 12, 1996 (hereby incorporated by reference).

As further shown by FIG. 2, reel body 14 includes an inner support shaft 30 forwardly projecting from reel body 14. Inner support shaft 30 is configured for removably coupling outer support shaft 20 to reel body 14. In the preferred embodiment illustrated, inner support shaft 30 includes a pair of resilient keys 32 which are operated by a push button mechanism 34 housed within outer support shaft 20 to release outer support shaft 20 from inner support shaft 30. Inner support shaft 30 is reciprocated by line recovery device 18 (shown in FIG. 1) to reciprocate outer support shaft 20 and spool 16 relative to flyer 24 and bail 26.

FIGS. 3–5 illustrate outer support shaft 20 and spool 16 in greater detail. FIG. 3 is a perspective view of spool 16 separated from outer support shaft 20. FIG. 4 is a side elevational view of outer support shaft 20. FIG. 5 is a sectional view of spool 16 taken along lines 5—5 of FIG. 3. As best shown by FIGS. 3 and 4, outer support shaft 20 is configured for supporting spool 16 and includes rear flange 38, hub 40, and lugs 42. Rear flange 38 extends radially outwardly from a rear end of hub 40 to define shoulder surface 44. Flange 38 further includes a circumferentially extending groove 46 sized for receiving ring 28.

Hub 40 forwardly projects from shoulder surface 44 of flange 38 and includes an outer circumferential surface 50 terminating in a tapered frusto-conical end 52. Frustoconical end portion 52 guides spool 16 over circumferential surface 50 of hub 40 toward shoulder surface 44. Circumferential surface 50 supports spool 16.

Lugs 42 radially project from circumferential surface 50 and are configured for coupling spool 16 to outer support shaft 20. In the preferred embodiment illustrated, lugs 42 comprise a pair of generally rectangular protuberances radially projecting from circumferential surface 50 and spaced approximately 180 degrees about hub 40. Alternatively, outer support shaft 20 may be provided with a single lug 42 or greater than two lugs 42 having other configurations and spacings.

As best shown by FIGS. 3 and 5, spool 16 is specifically sized and configured for mating over and about outer support shaft 20. Spool 16 generally includes anterior flange 56, posterior flange 58, hub 60 and line clip 61. Hub 60 extends between and joins anterior flange 56 and posterior flange 58 to form a peripheral groove 62 for stowing fishing line. Posterior flange 58 and hub 60 define an inner circumferential surface 64, axial passages 66 and helical recesses 68. Inner circumferential surface 64 is shaped and configured for extending about outer support shaft 20 adjacent outer circumferential surface 50.

Axial passage 66 comprises an axial recess formed within inner circumferential surface 64 adjacent posterior flange 58. Axial passage 66 communicates with helical recess 68.

Helical recess 68 is a generally circumferential recess formed within inner circumferential surface 64. Helical recess 68 circumferentially extends about inner circumferential surface 64 and axially extends towards anterior flange 56. Both axial passage 66 and helical recess 68 are dimensioned for receiving lug 42.

Line clip 61 includes a mounting portion 70 and a flap portion 72. Mounting portion 70 mounts line clip 61 to posterior flange 58 adjacent an outer circumferential surface 73 of posterior flange 58. Flap 72 integrally projects from mounting portion 70 in a direction opposite the direction that line recovery device 18 (shown in FIG. 1) wraps fishing line about spool 16. Flap 72 is preferably made from a resiliently flexible material such as plastic and extends into close tolerance with the outer circumferential surface 73 of posterior flange 58. Line clip 61 enables an angler to position fishing line between the outer circumferential surface 73 of posterior flange 58 and flap 72 to mark the amount of fishing line dispensed from spool 16. During recovery of the fishing line, clip 61 captures the fishing line against the outer circumferential surface of posterior flange 58. As a result, clip 61 enables an angler to repeatedly fish at the same depth. At the same time, however, line clip 61 enables the fishing line to easily dislodge from beneath line clip 61 for allowing additional line to be released when the fish is running with the lure or bait. This feature is extremely advantageous for jigging and deep water fishing.

Figure 6:
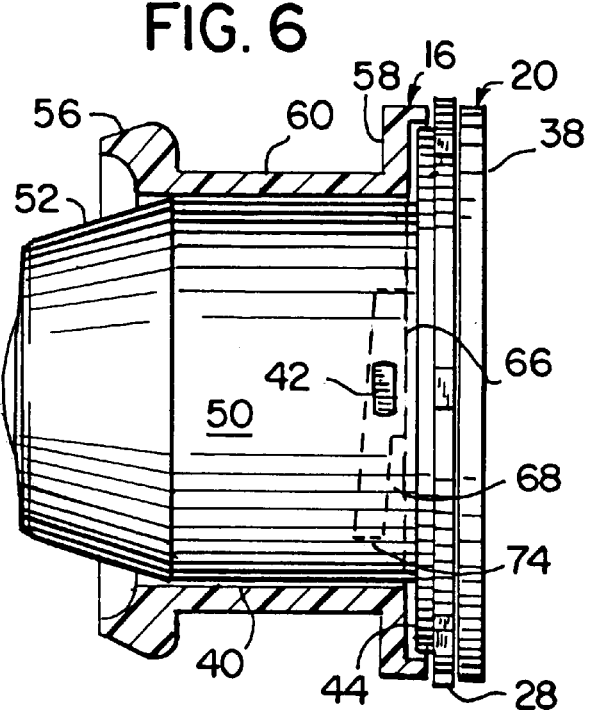
FIG. 6 is a sectional view of the spool positioned about the outer support shaft such that the lug is axially positioned within the axial passage.
Figure 7:
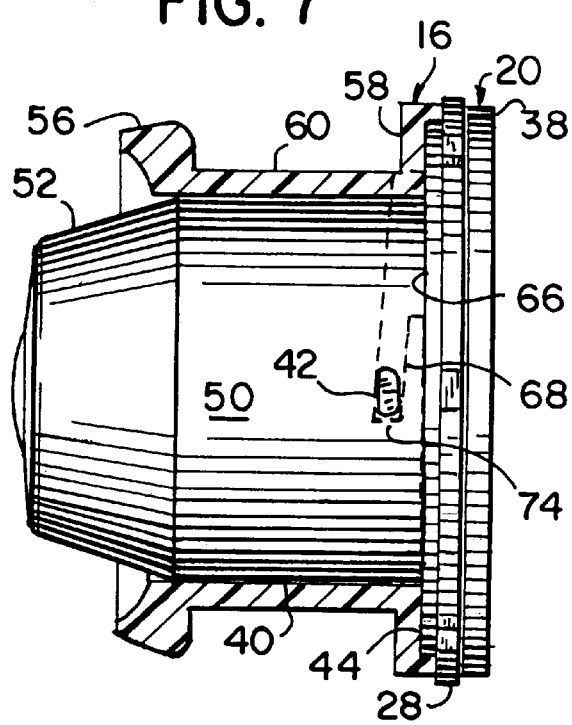
FIG. 7 is a sectional view of the spool positioned about the outer support shaft such that the lug is positioned within the helical recesses.

FIGS. 6 and 7 are sectional views illustrating spool 16 being secured to outer support shaft 20 by lugs 42. As shown by FIG. 6, spool 16 is initially guided over outer support shaft 20 to axially locate lug 42 within axial passage 66. As shown by FIG. 7, once lug 42 is axially positioned within axial passage 66, rotation of spool 16 axially captures lugs 42 within helical recess 68. Because helical recess 68 circumferentially extends about inner circumferential surface 64 towards anterior flange 56, rotation of spool 16 axially urges spool 16 and shoulder surface 44 of outer support shaft 20 towards one another into a close and tight relationship to eliminate unwanted axial movement of spool 16. Upon rotation of spool 16, lug 42 engages terminal end 74 of helical recesses 68 to limit rotation of spool 16.

Thus, as shown by FIGS. 6 and 7, spool 16 may be easily mounted to outer support shaft 20 of reel body 14 by axially positioning lugs 42 within axial passages 66 and by rotating spool 16 to lock and capture lugs 42 within helical recesses 68. This enables spool 16 to be easily coupled to reel body 14 by a quick twist of spool 16 relative to outer support shaft 20. As a result, multiple turns of spool 16 relative to outer support shaft 20 are unnecessary. In the preferred embodiment illustrated, helical recess 68 circumferentially extends within inner circumferential surface 64 for approximately 90 degrees. Therefore, coupling of spool 16 to reel body 14 requires less than one complete revolution of spool 16. As a result, spool 16 may be more easily and quickly removed and replaced with an alternative spool containing a different length or different weight fishing line.

In addition to allowing spool 16 to be more easily and quickly removed and replaced, reel 10 is more conveniently stored and more easily manufactured. Because axial passage 66 and helical recess 68 are both formed within the inner circumferential surface 64 of spool 16, the outer circumferential surfaces of anterior flange 56, posterior flange 58 and hub 60 have generally smooth, continuous and clean concave perimeters. Because axial passage 66 and helical recess 68 are formed in the inner circumferential surface 64 of spool 16, axial passage 66 and helical recess 68 do not increase the overall size or outer diameter of spool 16. As a result, spool 16 is less space consuming and may be easily stored within an angler's tackle box without becoming tangled with other lures, hooks and fishing accessories stored within the tackle box. Moreover, because axial passage 66 and helical recess 68 are formed within the inner diameter 64 of spool 16, the hollow interior of spool 16 is also less likely to catch or become tangled with fishing accessories stored within the tackle box. Because lugs 42 radially project from outer circumferential surface 50 of outer support shaft 20 and because axial passage 66 and helical recess 68 are formed within an inner circumferential surface 64 of spool 16, both outer support shaft 20 and spool 16 are simple and easily manufactured. Alternatively, lugs 42, axial passage 66 and helical recess 68 may be switched such that lugs 42 radially project from inner circumferential surface 64 of spool 16 while axial passage 66 and helical recess 68 are formed within the outer circumferential surface 50 of outer support shaft 20. Each alternative provides a simple, compact and easily manufactured removable spool that is quickly and easily coupled to a fishing reel.

Although the present invention has been described with reference to preferred embodiment, workers skilled in the art will recognize that changes may be made in form and detail without departing from the spirit and scope of the invention.

I claim:

1. A fishing reel comprising:
    a reel body having a spool support shaft with an outer circumferential surface;
    a spool having a hollow spool hub with an inner circumferential surface for extending about the shaft adjacent the outer circumferential surface;
    a recess formed along one of the outer circumferential surface of the support shaft and the inner circumferential surface of the spool hub, wherein the recess has a terminal end in said one of the outer circumferential surface of the support shaft and the inner circumferential surface of the spool hub to limit rotation of the spool;
    an axial passage formed along said one of the outer circumferential surface of the support shaft and the inner circumferential surface of the spool hub, wherein the axial passage communicates with the recess; and
    a lug radially projecting from the other of the outer circumferential surface of the support shaft and the inner circumferential surface of the spool hub.

2. The fishing reel of claim 1 wherein the recess is helical.

3. The fishing reel of claim 2 wherein the helical recess extends less than a complete revolution.

4. The fishing reel of claim 2 wherein the fishing reel includes a line recovery device which wraps fishing line about the spool in a first direction and wherein the spool includes:
    a line clip mounted to an outer circumferential surface of the spool and extending in a second direction for releasably capturing fishing line between the outer circumferential surface of the spool and the clip.

5. The fishing reel of claim 1 wherein the recess is formed along the inner circumferential surface of the spool hub and wherein the lug radially projects from the outer circumferential surface of the support shaft.

6. The fishing reel of claim 1 wherein the reel body is configured for being supported by a fishing rod extending along a first axis and wherein the spool extends about a second axis parallel to the first axis.

7. The fishing reel of claim 1 including a bail coupled to the reel body to rotate about the spool.

8. A fishing reel comprising:
    a reel body;
    a spool;
    a helical recess formed within a first one of the reel body and the spool, the helical recess having a terminal end in the first one of the reel body and the spool;
    an axial passage formed within the first one of the reel body and the spool, the axial passage communicating with the helical recess; and
    a lug projecting from a second one of the reel body and the spool such that the lug is axially insertable through the axial passage into the helical recess wherein relative rotation of the spool and the reel body couples the spool to the reel body and wherein relative rotation of the spool and the reel body is limited by the terminal end engaging the lug.

9. The fishing reel of claim 8 wherein the lug projects from the reel body.

10. The fishing reel of claim 8 wherein the spool has an outer circumferential surface and an inner circumferential surface, and wherein the helical recess and the axial passage are formed adjacent the inner circumferential surface of the spool.

11. The fishing reel of claim 8 wherein the helical recess extends less than a complete revolution.

12. The fishing reel of claim 8 wherein the fishing reel includes a line recovery device which wraps fishing line about the spool in a first direction and wherein the spool includes:
    a line clip mounted to an outer circumferential surface of the spool and extending in a second direction for releasably capturing fishing line between the outer circumferential surface of the spool and the clip.

13. The fishing reel of claim 8 wherein the reel body is configured for being supported by a fishing rod extending along a first axis and wherein the spool extends about a second axis parallel to the first axis.

14. The fishing reel of claim 8 including a bail coupled to the reel body to rotate about the spool.

15. A spool for use with a fishing reel including a reel body having a spool support shaft with a radially projecting lug, the spool compromising:

a hollow hub having an outer circumferential surface, an inner circumferential surface, a circumferential lug receiving recess formed within the inner circumferential surface and having a terminal end to limit rotation of the spool onto the shaft, and an axial passage formed in the inner circumferential surface and communicating with the recess.

16. The spool of claim 15 wherein the circumferential lug receiving recess is helical.

17. The spool of claim 16 wherein the helical recess extends less than one complete revolution about the inner circumferential surface.

18. The spool of claim 15 wherein the fishing reel includes a line recovery device which wraps fishing line about the spool in a first direction and wherein the spool includes:

a line clip mounted to an outer circumferential surface of the spool and extending in a second direction for releasably capturing fishing line between the outer circumferential surface of the spool and the clip.

19. A fishing reel comprising:

a reel body adapted for being supported by a fishing rod extending along a first axis, the reel body including a spool support shaft with an outer circumferential surface and extending along a second axis parallel to the first axis;

a spool having a hollow spool hub with an inner circumferential surface for extending about the shaft adjacent the outer circumferential surface;

a recess formed along one of the outer circumferential surface of the support shaft and the inner circumferential surface of the spool hub;

an axial passage formed along said one of the outer circumferential surface of the support shaft and inner circumferential surface of the spool hub, wherein the axial passage communicates with the recess;

a lug radially projecting from the other of the outer circumferential surface of the support shaft and the inner circumferential surface of the spool hub; and a wall surface formed on said one of the outer circumferential surface of the support shaft and inner circumferential surface of the spool hub, the wall surface defining a side of the recess and extending at least partially across opposite sides of the axial passage.

20. The fishing reel of claim 19 wherein the recess is helical.

21. The fishing reel of claim 19 wherein the recess has a terminal end to limit rotation of the spool onto the shaft.

22. The fishing reel of claim 19 wherein the reel body is configured for being supported by a fishing rod extending along the first axis and wherein the spool extends about a second axis parallel to the first axis.

23. The fishing reel of claim 19 including a bail coupled to the reel body to rotate about the spool.

24. A spool for use with a fishing reel including a reel body having a spool support shaft with a radially projecting lug, the spool comprising:

a hollow hub having an outer circumferential surface, an inner circumferential surface, a circumferential lug receiving recess formed within the inner circumferential surface, an axial passage formed in the inner circumferential surface and communicating with the recess and a wall surface defining a side of the recess and extending at least partially between opposite sides of the axial passage.

25. The spool of claim 24 wherein the spool extends about an axis and wherein the axial passage extends substantially parallel to the axis of the spool.

26. A fishing reel comprising:

a reel body adapted for being supported by a fishing rod extending along a first axis, the reel body including a spool support shaft having an outer circumferential surface and extending along a second axis parallel to the first axis;

a spool having a hollow spool hub with an inner circumferential surface for extending about the shaft adjacent the outer circumferential surface;

a recess formed along one of the outer circumferential surface of the support shaft and the inner circumferential surface of the spool hub;

an axial passage formed along said one of the outer circumferential surface of the support shaft and the inner circumferential surface of the spool hub, wherein the axial passage communicates with the recess; and a lug radially projecting from the other of the outer circumferential surface of the support shaft and the inner circumferential surface of the spool hub.

27. The fishing reel of claim 26 including a bail coupled to the reel body to rotate about the spool.

* * * * *